United States Patent [19]

Dezelan et al.

[11] 3,992,035

[45] Nov. 16, 1976

[54] COMBINATION HYDRAULIC AND MECHANICAL SUSPENSION SYSTEM

[75] Inventors: Joseph E. Dezelan, Indian Head Park; David S. Vinton, Morton, both of Ill.

[73] Assignee: Caterpillar Tractor Co., Peoria, Ill.

[22] Filed: June 20, 1975

[21] Appl. No.: 588,939

[52] U.S. Cl. ............................ 280/683; 280/685
[51] Int. Cl.² ................................................ B60P 1/60
[58] Field of Search ............. 280/104.5 R, 124 F, 6 R, 280/6 H, 6.1; 180/24.02

[56] References Cited
UNITED STATES PATENTS

| | | | |
|---|---|---|---|
| 2,777,529 | 1/1957 | Harbers | 28/104.5 R |
| 3,094,341 | 6/1963 | Alfieri | 180/24.02 X |
| 3,740,070 | 6/1973 | Butler | 280/104.5 R |

*Primary Examiner*—Philip Goodman
*Attorney, Agent, or Firm*—Phillips, Moore, Weissenberger Lempio & Strabala

[57] ABSTRACT

A tandem axle suspension system for a vehicle includes a first axle including non-adjustable fixed spring means for connecting the axle for support of the frame of the vehicle, and a second axle including an adjustable hydraulic spring means and including leveling valve means responsive to the distance between the second axle and the frame means for controlling communication of fluid to the second or adjustable hydraulic spring means.

11 Claims, 3 Drawing Figures

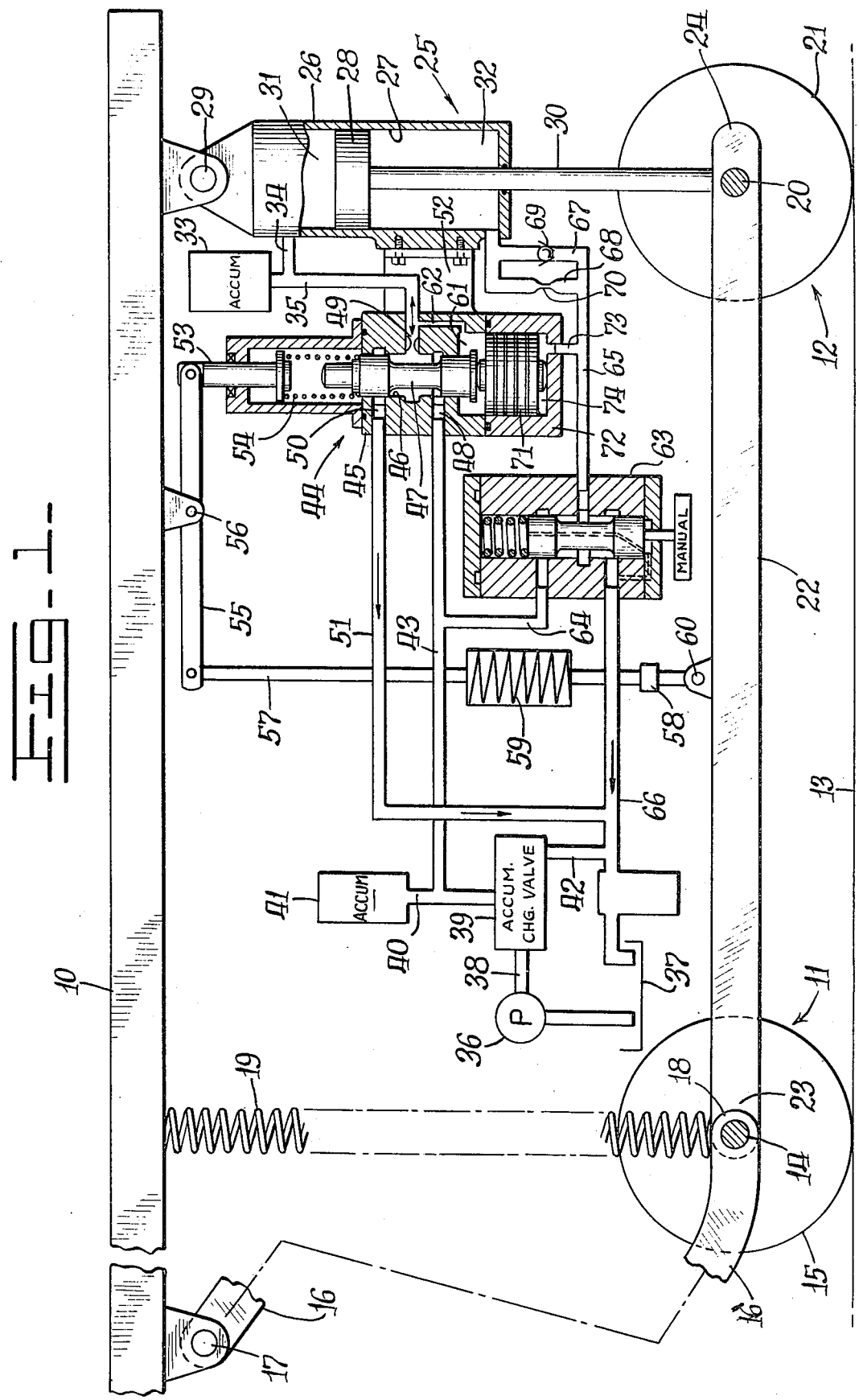

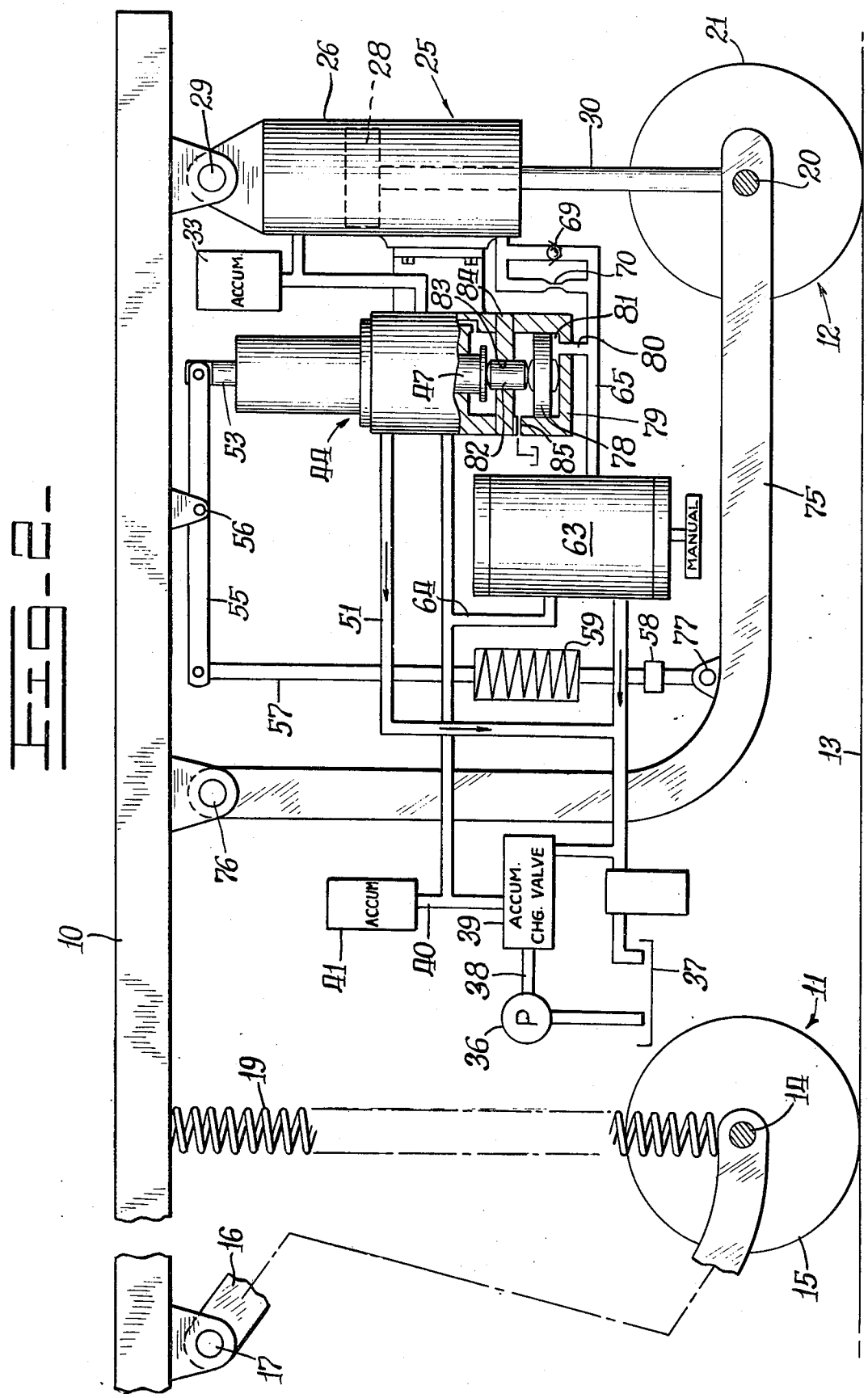

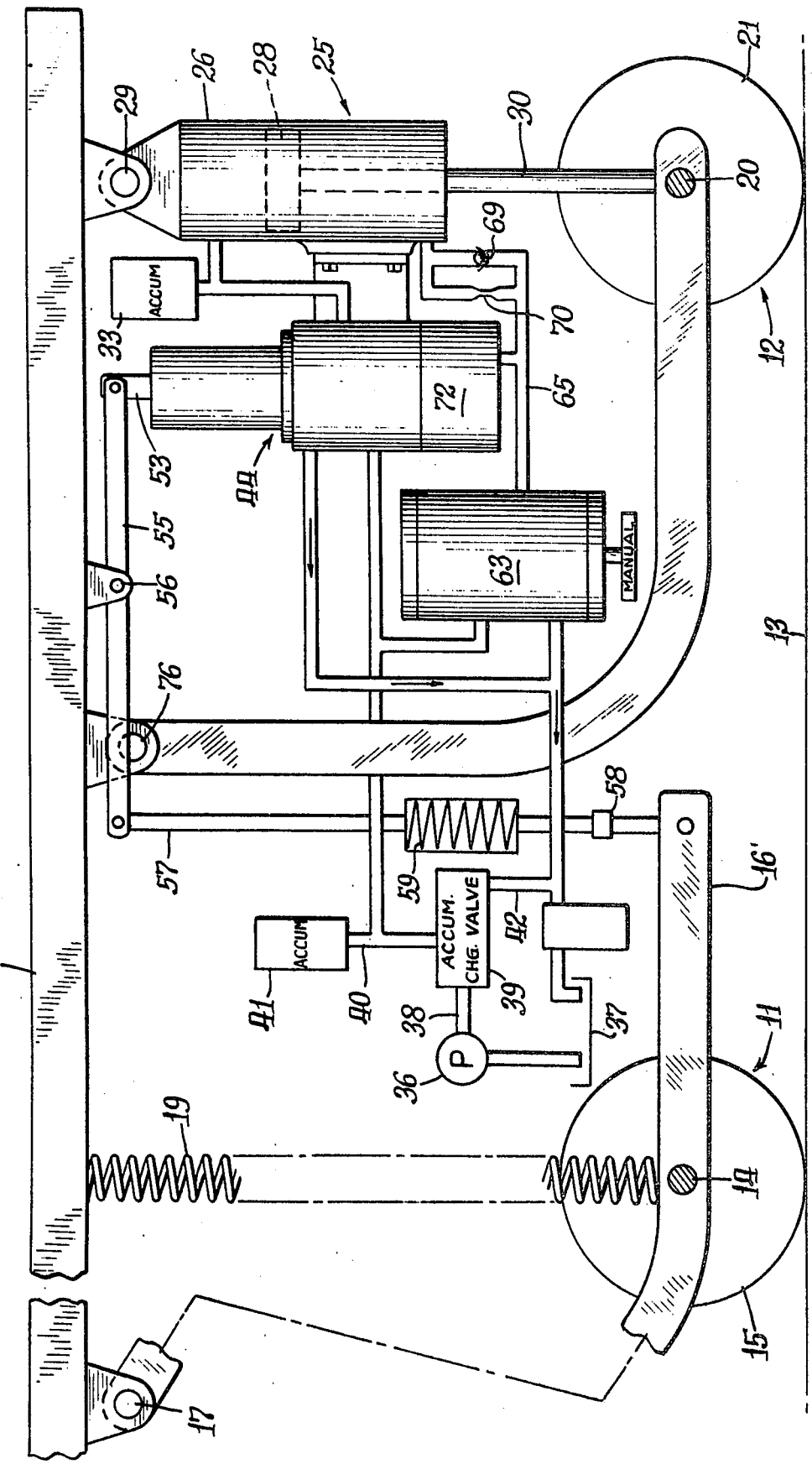

COMBINATION HYDRAULIC AND MECHANICAL SUSPENSION SYSTEM

BACKGROUND OF THE INVENTION

The present invention relates to vehicles, and pertains particularly to a tandem axle suspension system for a vehicle.

The use of tandem axle arrangement on transport vehicles is well known. Such tandem axle arrangements distribute the load of the vehicle over a greater number of wheels thereby reducing the stress and load on the wheels and the bearing assemblies thereof. This kind of an arrangement of tandem axles also distributes the weight of the vehicle over a greater number of wheels and a greater area of the road surface and the like, and this provides better support of the vehicle with less stress on the road surface and the like. Such tandem arrangements also provide better support of the vehicle for traversing uneven terrain and for support of the vehicle over soft or infirm road or terrain surfaces.

One of the major problems with use of such tandem axle arrangements is that when the vehicle is traversing uneven terrain or road surfaces a load of the vehicle is not always maintained evenly distributed between the tandem axles of the vehicles. Numerous prior art approaches to a solution of this problem are known.

Another problem with the use of tandem axles on a vehicle is that when a vehicle is not loaded the extra wheels on the road surface create high rolling resistance to movement of the vehicle. This can cause a high consumption of fuel because of the extra power needed to move the vehicle under such conditions.

SUMMARY AND OBJECTS OF THE INVENTION

It is the primary object of the present invention to overcome the above problems of the prior art.

It is another object of the present invention to provide a tandem axle support suspension system for a vehicle that is operative to evenly distribute the load of the vehicle between the tandem axles.

A further object of the present invention is to provide a tandem axle suspension system for a vehicle having automatic means to maintain the load level and to maintain an even distribution of the load between the tandem axles of the vehicle.

Still another object of the present invention is to provide a tandem axle suspension system for a vehicle having means to maintain a substantially level load of the vehicle and to maintain at substantially even distribution of a load between the tandem axles of the vehicle when the vehicle is loaded and for lifting one axle of the vehicle from engagement with the roadway or other supporting surface when the vehicle is unloaded. A still further object of the present invention is to provide a tandem axle suspension system for a vehile having means for maintaining a distribution of a load of the vehicle on the wheels of the respective axles, and for raising one of the axles when the vehicle is unloaded with safety means for preventing the raising of the said axle when the load on the vehicle is such as to maintain a certain predetermined load pressure in the suspension system.

In accordance with the primary aspect of the present invention, a tandem axle suspension system for a vehicle is provided with a first axle including non-adjustable spring means for supporting the load of the vehicle on the first axle, and a second axle having adjustable spring means with automatic means for maintaining a predetermined level of the vehicle with respect to the axles and an even distribution of the load of the vehicle between the axles when the vehicle is loaded. Means are provided for raising one of the axles when the vehicle is unloaded provided the system pressure exceeds the load pressure within the system.

BRIEF DESCRIPTION OF THE DRAWINGS

The above and other objects and advantages of the present invention will become apparent from the following description when read in conjunction with the drawings wherein:

FIG. 1 is a schematic elevational view of a preferred embodiment of the present invention;

FIG. 2 is a view as in FIG. 1 of another embodiment of the present invention; and FIG. 3 is a view as in FIG. 1 of still another embodiment of the present invention.

DETAILED DESCRIPTION OF THE PREFERRED EMBODIMENT

Turning now to FIG. 1 of the drawing, there is illustrated a suspension system in accordance with the present invention, a vehicle frame 10 which is supported by a first axle assembly indicated generally by the numeral 11, and a second axle assembly indicated generally by the numeral 12. These axles are arranged in tandem arrangement and each include the usual wheels, which may include suitable inflatable rubber tires engaging a road surface or the like 13 for supporting the vehicle.

The first axle assembly comprises an axle 14 on which is rotatably mounted at least a pair of wheels 15 of suitable construction for supporting the vehicle. The axle 14 is pivotally supported by suitable means, such as a beam 16 which is pivotally connected at one end 17 to the frame 10 of the vehicle and connected at the other end 18 to the axle 14. The axle is further connected to the frame 10 for support of the frame by means of suitable resilient means, such as a mechanical non-adjustable spring means 19. This spring may be of any suitable type but is preferably the compression type as illustrated. The pivot point 17 is some distance ahead of the axle 14 so that the angle between the beam 16 and the frame 10 may be kept to an acceptable range.

A second axle assembly includes an axle 20 having the usual at least pair of wheels 21 rotatably mounted thereon for engaging to ground 13 and supporting the axle thereon. The axle 20 is pivotally supported in a suitable manner to the frame, such as by means of a beam 22 which is pivotally connected at one end 23 to the first axle 14 of the beam 16 and is connected at its other end 24 to the axle 20.

The axle 20 is resiliently connected to the frame 10 by suitable spring means comprising a piston and cylinder arrangement indicated generally at 25 and including a housing 26 having a cylindrical bore 27 therein in which is reciprocably mounted a double-acting load supporting piston 28. The cylinder housing 26 is connected in a suitable manner, such as by a pivot 29, to the frame 10. The double-acting piston 28 includes a rod 30 extending therefrom and externally of the cylinder housing 26, and is connected at its lower end to the axle 20.

The piston 28 within the bore 27 defines a chamber 31 at the head end of the piston 28 within the pressurized fluid is admitted for supporting the frame 10 and load of the vehicle with respect to or upon the axle 20. A second chamber 32 at the rod end of the piston 28 is defined into which pressurized fluid may be admitted for placing the axle 20 upward so that the wheels 20 disengage the surface of the roadway or earth 13 and is suspended from the vehicle frame 10.

The adjustable spring means of the second axle 20 includes in addition to the piston and cylinder assembly 25 an accumulator 33 which is an open communication by a suitable conduit means of passage 34 with the head end or chamber 31 of the piston 28. Accumulator 33 is also in communication by a conduit 35 with a source of pressurized fluid for maintaining the accumulator 33 charged and for supplying fluid for chamber 31. The accumulator 33 essentially provides a spring for the system since the fluid used in the cylinder 25 is preferably of an incompressible hydraulic fluid.

Leveling control means for the vehicle and for supplying or controlling the adjustable spring means includes a source of pressurized fluid comprising a pump 36 which draws fluid from a tank or sump 37 and supplies it by way of suitable conduit means 38 to an accumulator charging valve 39 which supplies the fluid by way of suitable conduit means 40 to an accumulator 41 which accumulates fluid for supplying to the system so that pump 36 is not required to continuously run or to continuously start and stop. The accumulator valve 39 directs fluid to the accumulator 41 until the accumulator accumulates a certain amount of fluid at a predetermined pressure, at which time the accumulator valve 39 directs the fluid by suitable return line 42 back to tank or sump 37. Suitable control means may also be provided for automatically cutting off motor 36 or motor driving pump 36 when accumulator 41 becomes fully charged. Fluid from the source, including pump 36 and accumulator 41, is available and is supplied or communicated by way of conduit 43 to a leveling control valve indicated generally by the numeral 44 which is operative in response to variations in the distance between the frame 10 and the axle 20 for controlling the communication of fluid from the source to the second accumulator 33 which makes that fluid available to the chamber 31 for support of the vehicle.

The leveling valve 44 includes a housing 45 having a cylindrical bore 46 therein in which is reciprocably mounted a spool 47 for controlling communication between an inlet port 48 in communication with the supply line 43 and an orificed or restricted port 49 in communication with a conduit 35 for supplying fluid to the accumulator 33. The spool 47 is operative in its first position, as illustrated, to provide the just-described communication. The spool is operative in a second position to provide communication between the line 35 by way of port 49 with an outlet port 50 to a return line 51 for permitting the return of fluid from the accumulator 33 and chamber 31 of cylinder 25 to the tank or sump 37. The port 49 includes restricting means, as shown, to properly control the rate of flow of fluid from chamber 31. The valve housing 45 is mounted in a suitable manner within the system such as by means of a bracket 52 secured in a suitable manner such as by screws or the like to cylinder housing 26. The valve housing may also be secured to other portions of the system such as, for example, to the vehicle frame 10.

The valve 44 is controlled by suitable linkage means comprising a rod 53 connected in a suitable manner such as by a spring 54 to the valve spool 47 and to a rocker arm or lever 55 which is pivoted such as at 56 to the vehicle frame 10. An adjustable link 57 having suitable adjusting means 58 and resilient means 59 is connected such as by suitable pivot means 60 to the beam 22 at one end, and at the other end to the lever or rocker arm 55.

With this linkage arrangement, the adjustable link 57 is preadjusted for a predetermined height of the frame 10 above the axle 20. With this arrangement, however, wherein the beam 22 is connected between the axle 14 and the axle 20 the linkage arrangement for the valve 47 is responsive to an average distance of the two axles 14 and 20 from the frame 10. Thus, when either one of the axles moves upward toward the frame 10, point 60 on link 57 likewise moves upward and forces the arm 55 to rock about the pivot point 56 forcing the rod 53 downward toward the valve spool 47 shifting the valve spool downward, as shown, for communication of fluid by way of line 43 to the accumulator 33 and the chamber 31. This additional fluid introduced into chamber 31 forces piston 28 downward and thus the axle 20 downward with respect to the frame 10.

When either one or both of the axles 14 and 20 moves away from the frame member 10, link member 57 is pulled downward rocking the arm 55 about pivot 56 pulling the rod 53 away from the valve spool 47 permitting the valve spool to move upward as a result of pressure acting on the lower end of spool 47 in chamber 61 communicated thereto from conduit 35 and accumulator 33 by way of passage 62. Thus, communication is established between the line 35 and the return line 51 to permit exhaust of fluid from the cylinder chamber 31 and thus permit the piston 28 to move upward toward the frame 10 and likewise the axle 20 to move upward toward the frame 10. The action of this system, as pointed out above, is such that the load on the vehicle will be substantially evenly distributed between the axles 14 and 20 and the height of the vehicle frame 10 with respect to the axles will be maintained at a substantially constant preselected position. This will be carried out substantially automatically.

The system also includes means for raising the second axle 20 with respect to the frame 10 which means comprises a manual selector valve 63 which is operative to provide communication between the supply line branch 64 and conduit means 65 which in turn communicates with the rod end chamber 32 for forcing piston 28 upward within the cylinder housing 26. The vale 63 is also operative in the position, as shown, for communicating the line 65 by way of a return line 66 to the tank or sump 37. Suitable damping means for the cylinder 25 includes a pair of parallel passages 67 and 68 in which is disposed check valves 69 and restriction means 70. This arrangement permits free flow of flid into the chamber 32 but restricts the flow of fluid outward therefrom, thus providing damping means on the piston 28 within cylinder 27.

Safety means for the system for preventing raising of the wheel or axle 20 when a certain predetermined load is maintained on the vehicle comprises a piston 71 which is reciprocably disposed within a housing 72 at the end of the valve housing 45 wherein the piston 71 acts against the spool 47. The piston will have equal areas in opposing communication respectively with the load pressure within the system and the source pressure within the system. The load pressure within the system will be the pressure of the fluid in chamber 31 as a result of loads on the vehicle, which pressure will be communicated back by way of conduit means 34, 35 and passage 62 to chamber 61 for acting on the upward end of the piston 71. The system pressure will be pressure from the source comprising pump 36 and accumulator 41 communicated by way of conduits 43, 64 and valve 63 along conduit 65 and passage 73 to chamber 74 for acting on the lower end of the piston 71. Thus, when the fluid pressure within chamber 61 is equal to or greater than the fluid pressure within chamber 74, the piston 71 will not move upward to shift valve 47 to a position to return fluid from chamber 31 to tank or sump 37. Thus, the wheels 21 cannot be lifted when system load pressure is equal to or greater than the system source pressure. This provides a safety feature which may be adjustable to insure that the second axle is used to support the vehicle when a certain minimum load is carried by the vehicle.

Turning now to the embodiment of FIG. 2, identical elements will be identified by indentical numerals. In this embodiment, the main significant distinction lies in the fact that the beam for pivotally supporting axle 20 comprises a beam 75 which is pivotally supported at one end 76 directly to the vehicle frame 10 at a point between the respective axles 14 and 20. In this embodiment, the link 57 is connected by suitable pivot means at its lower end to a point 77 on the beam 75. Thus, in this arrangement a leveling valve means 44 will be more directly responsive to the differences or variations thereof.

A further distinction of this embodiment lies in the means which permit the axle 20 to be lifted regardless of the load on the vehicle. In this arrangement, a piston 78 is disposed within a housing 79 connected to the lower end of the valve housing 44 with the piston 78 acted on solely by means of pressure from the system source communicated by way of passage 80 to chamber 81 acting on the lower side of piston 78. The piston is connected by suitable plunger or piston means 82 extending through a bore 83 in wall 84 to act on the lower end of the valve spool 47 for shifting the valve spool upward in its position to permit communication of fluid from the chamber 31 to the return line 51 and to sump 37. The wall 84 separates the load pressure from the upper face of piston 78. The piston area of piston 78 acted on by system pressure is larger than the opposing piston area of piston 82 acted on by load pressure. This permits shifting of the valve spool by system pressure irrespective of load pressure. This permits fluid to be communicated to the rod end of the cylinder 25 and the fluid to be evacuated from the head end of the cylinder to raise the axle 20. Such an arrangement may be necessary such as, for example, when a flat tire should occur on the second axle 20 of the vehicle.

Turning now to the FIG. 3 embodiment, it will be seen that the main distinction herein lies in the fact that the control link 57 is connected to an extension of beam 16' which connects the front axle to the vehicle frame. With this arrangement the response of the leveling valve 44 will again be responsive more to the relationship or variation between the front axle and the vehicle than, as in the previous embodiments, on the rear axle and the frame.

While the present invention has been defined and described by means of specific embodiments, it is to be understood that numerous changes and modifications may be made therein without departing from the spirit and scope of the invention as defined in the appended claims.

What is claimed is:

1. A tandem axle suspension system for a vehicle, comprising in combination:
   a vehicle frame;
   a first axle;
   first mounting means for mounting said first axle beneath said frame and including a first beam for connecting said first axle to said frame and first spring means for resiliently supporting said frame on said first axle;
   a second axle;
   second mounting means for mounting said second axle beneath said frame in tandem with said first axle and including a second beam for connecting said second axle to said frame adjustable fluid spring means including a piston and cylinder assembly connected between said frame and said second axle for adjustably supporting said frame on said first and second axles; and
   leveling control means including a source of pressurized fluid including first accumulator means for supplying fluid for said fluid spring, second accumulator means in open communication with the head end of said piston and cylinder assembly, and leveling valve means for controlling communication of fluid from said source to said second accumulator and said piston and cylinder assembly for controlling the fluid spring means for maintaining said frame at a predetermined height above said axles, wherein said first beam is pivotally connected at one end to said frame and connected at the other end to the first axle; and, said second beam is pivotally connected at one end to said first axle and connected at the other end to said second axle.

2. The suspension system of claim 1 wherein said leveling valve means is responsive to a variation between the distance between either of said axles and said frame for controlling said communication of fluid to said second accumulator means.

3. The suspension system of claim 2 wherein said level control means includes adjustable linkage means connected between one of said beams and said leveling valve means.

4. A tandem axle suspension system for a vehicle, comprising in combination:
   a vehicle frame;
   a first axle;
   first mounting means for mounting said first axle beneath said frame and including a first beam connected at one end to said frame and connected at the other end to said first axle for connecting said first axle to said frame, and first spring means for resiliently supporting said frame on said first axle;
   a second axle;
   second mounting mean for mounting said second axle beneath said frame in tandem with said first axle and including a second beam pivotally connected at one end to said frame and connected at the other end to said second axle for connecting said second axle to said frame, adjustable fluid spring means including a piston and cylinder assembly connected between said frame and said second axle, for adjustably supporting said frame on said first and second axles; and
   leveling control means including a source of pressurized fluid including first accumulator means for supplying fluid for said fluid spring, said adjustable spring means comprises second accumulator means in open communication with the head end of said piston and cylinder assembly, and leveling valve means responsive to a variation between the distance between said second axle and said frame for controlling communication of fluid from said source to said second accumulator and said piston and cylinder assembly for controlling the fluid spring means for maintaining said frame at a predetermined height above said axles wherein said level control means includes adjustable linkage means connected between the second of said beams and said leveling valve means.

5. The suspension system of claim 3 wherein said linkage means is connected to the first of said beams.

6. The suspension system of claim 4 wherein said linkage means is connected to the second of said beams.

7. A tandem axle suspension system for a vehicle, comprising in combination:
- a vehicle frame;
- a first axle;
- first mounting means for mounting said first axle beneath said frame and including first spring means for resiliently supporting said frame on said first axle and a source of pressurized fluid including first accumulator means for supplying fluid for said fluid spring;
- a second axle;
- second mounting means for mounting said second axle beneath said frame in tandem with said first axle and including adjustable fluid spring means including a double-acting piston and cylinder assembly connected between said frame and said second axle, second accumulator means in open communication with the head end of said piston and cylinder assembly for adjustably supporting said frame on said first and second axles;
- leveling control means including a source of pressurized fluid and leveling valve means responsive to variations in a predetermined distance between said frame and either one of said axles for controlling communication of fluid to said second accumulator means and said piston and cylinder assembly for controlling the fluid spring means for maintaining said frame at a predetermined height above said axles; and
- manual valve means for selectively communicating pressurized fluid to said piston and rod assembly for raising said second axle to a position so that said second axle is supported by said frame.

8. The suspension system of claim 7 including safety means for preventing raising of said second axle when the pressure of the fluid in said cylinder supporting said frame on said axle is equal to or greater than the pressure of the fluid from said source.

9. The suspension system of claim 8 wherein said safety means includes a valve control piston responsive to support pressure acting on said leveling valve means for preventing movement of said valve to said raise position.

10. The suspension system of claim 9 wherein said valve control piston is responsive to said source pressure communicated thereto by said manual control valve for shifting said leveling valve to a venting position when said source of pressure exceeds said support pressure.

11. A tandem axle suspension system for a vehicle, comprising in combination:
- a vehicle frame;
- a first axle;
- first mounting means for mounting said first axle beneath said frame and including first spring means for resiliently supporting said frame on said first axle;
- a second axle;
- second mounting means for mounting said second axle beneath said frame in tandem with said first axle and including adjustable fluid spring means comprising a piston and cylinder assembly connected between said frame and said second axle, second accumulator means in open communication with the head end of said piston and cylinder assembly for adjustably supporting said frame on said first and second axles; and
- leveling control means including a source of pressurized fluid including first accumulator means for supplying fluid for said fluid spring leveling valve means responsive to variations in a predetermined distance between said frame and either one of said axles for controlling communication of fluid from said source to said second accumulator and said piston and cylinder assembly for controlling the fluid spring means for maintaining said frame at a predetermined height above said axles and differential piston means acting on said leveling valve, said piston means includes a first piston area in communication with fluid in said cylinder and second piston area in selective communication with fluid from said source of pressurized fluid.

* * * * *